Feb. 20, 1968     L. P. SNODGRASS ET AL     3,369,791
DISC TYPE FLOW CONTROL VALVE
Filed March 18, 1965
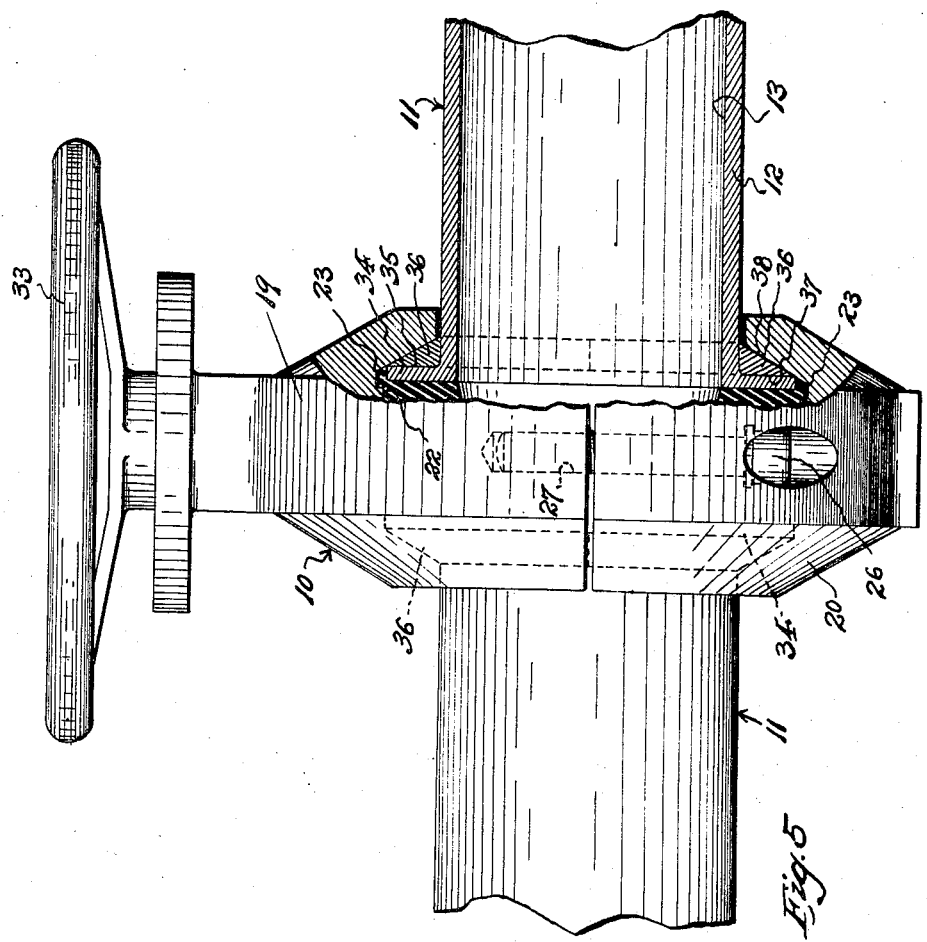
INVENTORS—
Lee P. Snodgrass & Dagny A. Ahrens,
BY Richards & Cifelli,
Attorneys—

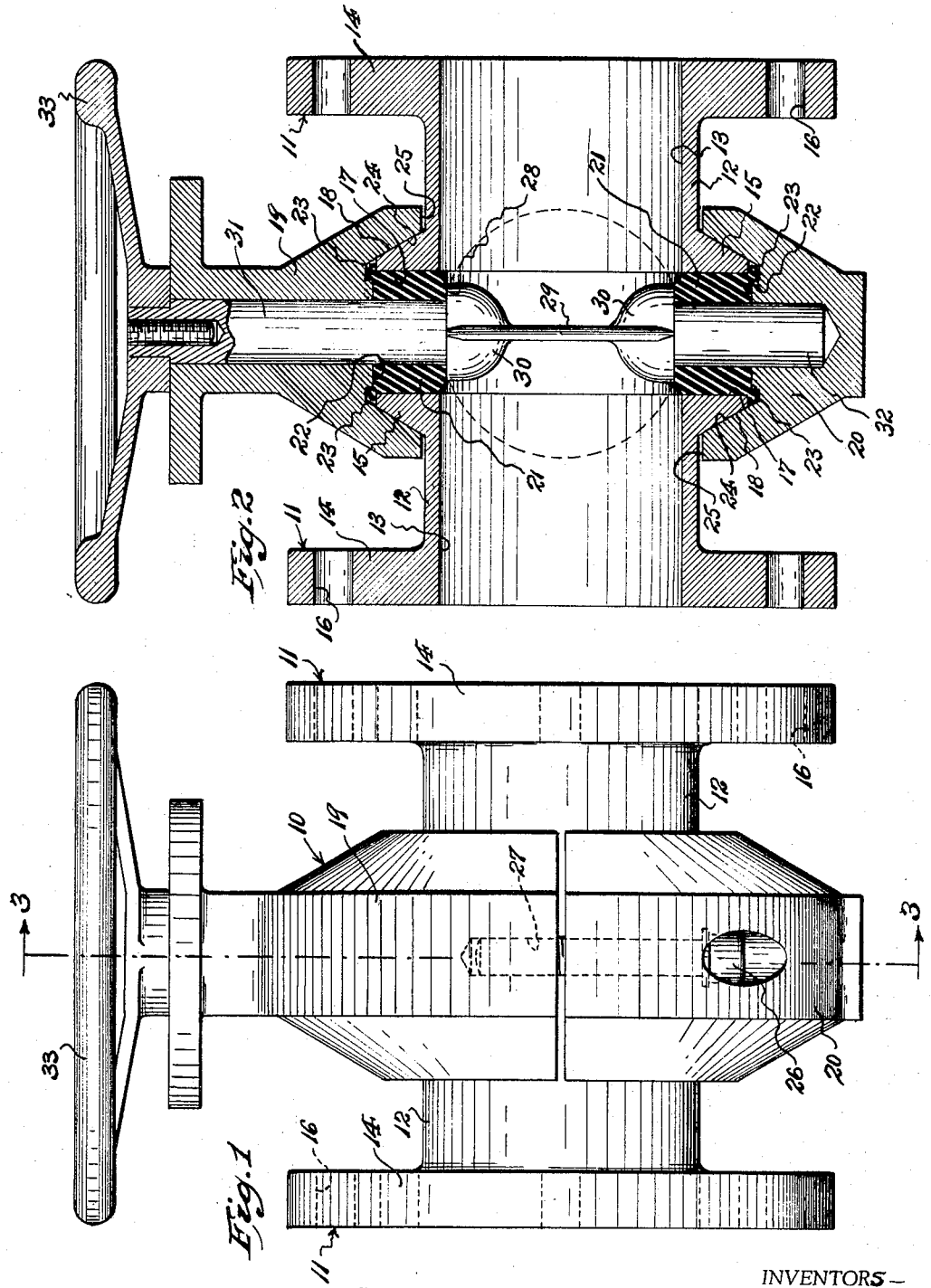

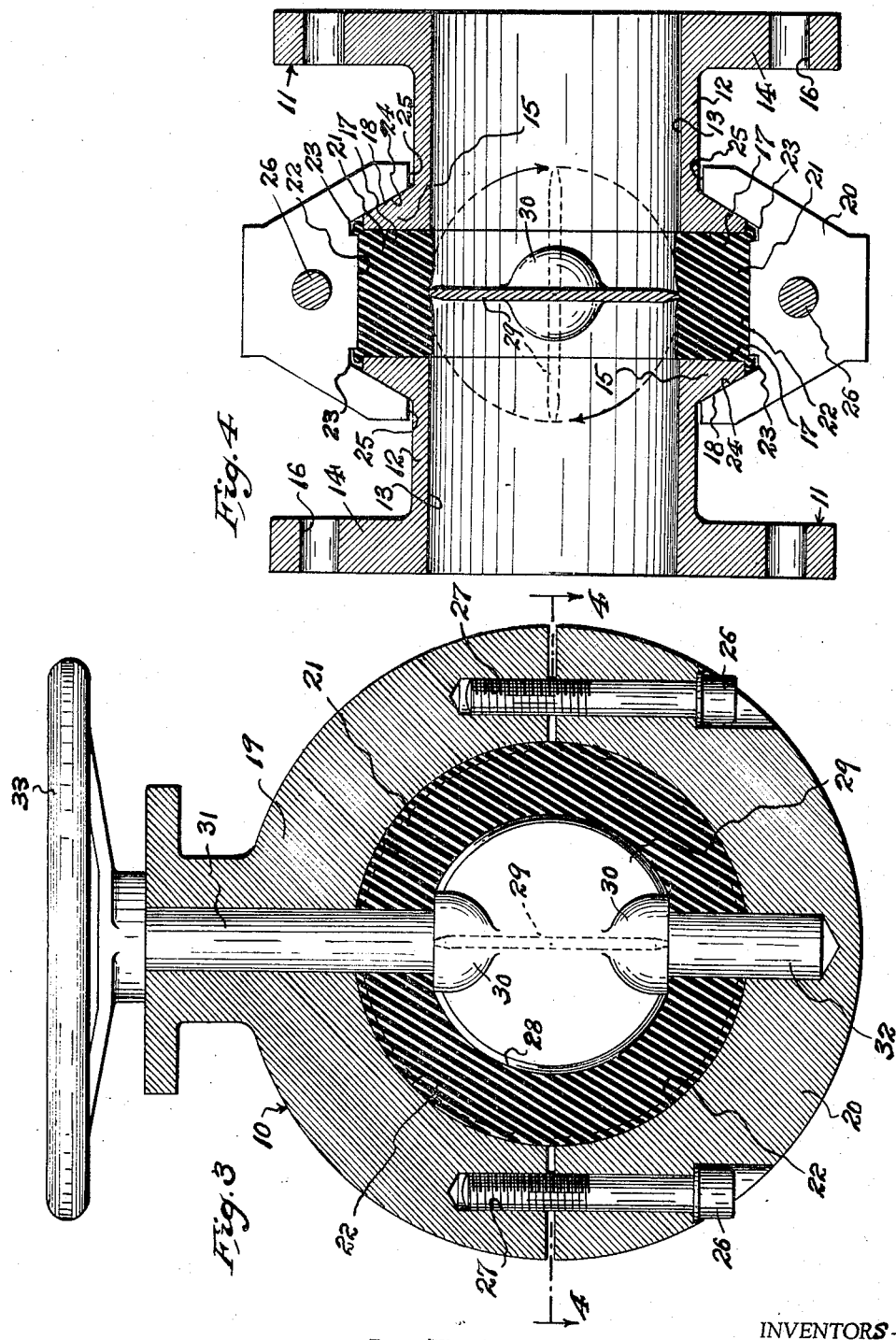

United States Patent Office 3,369,791
Patented Feb. 20, 1968

3,369,791
DISC TYPE FLOW CONTROL VALVE
Lee P. Snodgrass, 44 Sandra Circle, Apt. 1A, Westfield, N.J. 07090, and Dagny A. Ahrens, 2111 Gallagher Ave., Scotch Plains, N.J. 07076
Filed Mar. 18, 1965, Ser. No. 440,755
6 Claims. (Cl. 251—170)

ABSTRACT OF THE DISCLOSURE

A butterfly flow control valve is described which consists of a vertically disposed valve stem having manual means to turn it and a disc-shaped valve member intermediate its ends. The disc-shaped valve member is rotatable between open and closed positions within the axial bore of an annular, resilient valve seat member in the form of a section of a cylinder. A pair of union ends having flat faced annular flanges at their inner ends are disposed on opposite sides of the valve seat members with the flat faces of the flanges in sealing contact with the seat member. Two or more valve body members having central bearing surfaces in contact with the circumference of the valve seat member have sloping planar bearing surfaces spaced from each side of the planar bearing surface. The sloping bearing surfaces of the body members slidably contact complementary sloping bearing surfaces on the back of the annular flanges of the union ends. Means are provided for drawing the body members together whereby the central planar bearing surfaces apply radial constrictive force to the seat member and the sliding contact of the opposed sloping bearing surfaces on the body members and union ends apply axial constrictive forces to the seat member. In this way tightening or loosening the means for drawing the body members together results in increasing or decreasing the axial and radial constrictive forces on the seat member thus adjusting the sealing forces as necessary to prevent leakage due to a change in pressure, wear or swelling of the resilient valve seat member.

---

This invention relates to a novel and improved construction of a disc type valve which is adapted for use in a wide variety of industrial applications where it is desired to control the flow of fluid in a conduit.

Disc type or butterfly flow control valves are well known, and have been in widespread use for many years. In general, such valves consist of a valve body, adapted to be mounted in a conduit such as a pipe, a resilient valve seat member mounted in the valve body and having an axial bore therethrough aligned with the axis of the conduit to permit fluid flow when the valve is open, a disc or butterfly type valve member mounted within the axial bore of the valve seat, and means for rotating the disc within the valve seat to open and close the valve and thus control fluid flow.

Although the comparative simplicity of butterfly valves would suggest their use in innumerable industrial applications, such use has been limited heretofore by certain inherent disadvantages of previously available valves of this type. For example, it has previously been considered necessary to provide the resilient valve seat member with a complex cross section adapted to be fitted or keyed into the body of the valve, which has also been provided with a complex cross section in order to anchor the resilient valve seat. The manufacture of such resilient valve seats and valve bodies of complex shape to close tolerances is not only difficult but expensive. The complex shapes of such valve members also complicates assembly of the valves and replacement of worn parts.

Inasmuch as the valve disc must be somewhat larger in diameter than the axial bore of the resilient valve seat in order to provide a seal when the valve is closed, turning of the valve disc in the seat tends to wear and thus enlarge the axial bore of the valve seat. Flow of fluid through the axial bore of the valve seat, particularly if the fluid contains abrasive particles, also tends to wear and enlarge its axial bore. In any event, enlargement of the axial bore of the valve seat by any means requires replacement of the resilient valve seat. Similarly, repeated opening and closing of the valve tends to cause wear of the resilient valve seat around the valve stem connected to the disc valve, since the stem normally extends through a vertical bore hole in the valve seat. This, of course, introduces another possibility of leakage which may require replacement of the valve seat.

Fluids in contact with the resilient valve seats may also alter their size by causing them to swell or, in the case of chemical attack, by causing deterioration and leakage.

It has long been apparent, therefore, that the utility of available butterfly valves would be greatly enhanced if means could be provided for securely anchoring a resilient valve seat of simple design in the valve body, for increasing the leak-free life of the seating member, and compensating for swelling of the seat member.

It is a primary object of the present invention, therefore, to provide an improved butterfly valve structure adapted to firmly anchor a resilient seating member of simple design in the valve body to provide control of fluid flow under widely varying conditions of use without leakage.

It is another object of the invention to provide a novel valve body structure, of improved and simplified design, adapted to be adjusted for service under varying conditions of use.

It is still another object of the invention to provide a novel and improved butterfly valve structure adapted to be adjusted to compensate for wear or swelling of the resilient seat to prevent leakage.

It is yet another object of the invention to provide a novel butterfly valve structure of a simplified design composed of a minimum number of standardized, interchangeable parts, none of which must be made to closer tolerances than is customary and convenient in ordinary manufacturing practice.

It is another object of the invention to provide a novel valve structure which is rugged and dependable in operation and which may be operated by unskilled labor.

It is another object of the invention to provide a novel valve structure which may be quickly and easily disassembled for repair or replacement of parts and reassembled by unskilled labor.

It is still another object of the invention to provide a simplified butterfly valve structure which is adapted to be installed in any type of conduit under field conditions without the use of special tools or modification of existing fittings in the conduit.

The above and other objects of the present invention, which will be apparent from the following detailed description, are attained by providing a novel butterfly valve structure having a split body portion provided with inclined bearing surfaces adapted to engage correspondingly inclined bearing surfaces on a pair of union ends in order to adjustably engage and constrict a simple annular resilient valve seat disposed therebetween.

The invention will now be described in greater detail in conjunction with the accompanying drawings wherein:

FIG. 1 is a longitudinal, side elevational view of a butterfly valve of the present invention mounted on, and connecting, a pair of union ends which are adapted to be connected to suitable conduits;

FIG. 2, is a vertical, longitudinal cross sectional view of the valve of FIG. 1 taken through the longitudinal axis of the union ends and in part through the vertical axis of the valve stem;

FIG. 3 is a vertical transverse cross sectional view of the valve taken along the line 3—3 in the direction indicated in FIG. 1;

FIG. 4 is a horizontal, cross sectional view of the valve taken along the line 4—4 of FIG. 3; and FIG. 5 is a longitudinal, side elevational view of a butterfly valve partly broken away and in section showing another embodiment of the invention.

Like characters of reference are employed in the above described views, to indicate corresponding parts of the valve structure.

Referring to the drawings in greater detail, the reference numeral 10 indicates a butterfly valve of the invention mounted between a pair of union ends 11. The union ends 11 include a hollow body 12 having an axial bore 13 therethrough, and are provided with an annular connecting flange 14 at one end, and an annular sealing flange 15 at the other end. Each connecting flange 14 is provided with a plurality of bore holes 16 therethrough to receive bolts or other suitable means not shown for connecting the union end 11 to a conduit or other vessel, not shown. The sealing flange 15 has a generally flat planar face 17 normal to the axis of the bore 13, and a sloped external shoulder 18 forming an obtuse angle with the body 12. The valve 10 comprises an upper body member 19, a lower body member 20, and a resilient seating member 21. The upper and lower valve members 19 and 20 have a generally semicircular, transverse, vertical cross section, as best seen in FIG. 3 of the drawings, which adapts them to surround the bodies 12 of a pair of union ends 11 positioned in axial alignment with the faces 17 of their sealing flanges 15 abutting against opposite sides of a resilient seating member 21 therebetween. The planar faces 17 of the flanges 15 may be smooth, or may be provided with embossed or scribed lines or other surface roughening to facilitate sealing contact with the valve seat 21. As best seen in cross section in FIGS. 2 and 4, each body member 19 and 20 has a central planar bearing surface 22 which is flat in the direction of the longitudinal axis of bore hole 13 of the union ends 11, but which is curved in the transverse direction as best seen in FIG. 3. A pair of annular grooves 23 are provided in each of the body members, one on each side of the bearing surface 22. A sloping planar bearing surface 24 extends from the outer edge of each groove 23 to the inner edge 25 of the body member.

The upper and lower body members 19 and 20 are connected and drawn together by means of Allen screws 26 (socket-headed machine screws) threaded into suitable internally threaded bore holes 27. Of course, any other suitable means may be employed for drawing the body members together.

The resilient seating member 21 is provided with a bore hole 28 within which is positioned the disc or butterfly 29 having outwardly flared sockets 30 at the top and bottom. An upper valve stem 31 is anchored in the upper socket 30 and a lower valve stem 32 in axial alignment therewith is anchored in the lower socket 30. The upper valve stem 31 is suitably connected to suitable means for turning said valve stem, such as the wheel 33.

In another embodiment of the invention, illustrated in FIG. 5, conventional union ends 11 are employed having an annular flange 34 normal to the axis of the union end. The flanges 34 have a planar face 17, but lack the sloped shoulders 18 of flanges 15 of FIGS. 2 and 4, being simply provided with a flat back surface 35 normal to the axis of the union end 11. A pair of semicircular split filler members 36 having a wedge shaped cross section as shown in FIG. 5 are employed to fill the space between the flat back 35 of the flange 34 and the sloped bearing surfaces 24 of the body members 19 and 20. It will be seen that the filler members 36 have a flat face 37 adapted to contact the surface 35 of the back of flange 34, and a sloped face 38 adapted to contact the sloped bearing surfaces 24 of the body members. The lower inner edge of filler members 36 may be provided with a radius conforming to the radius found between the body 12 and flange 34 of conventional union ends 11. By the use of filler members 36, it is possible to mount the new butterfly valves between conventional union ends 11 in a conduit, without the necessity of replacing the existing union ends with others of the type shown in FIGS. 2 and 4, which are provided with sealing flanges 15.

As may best be seen in FIG. 3, the resilient seating member 21 is provided with bore holes at top and bottom to receive the upper and lower valve stems 31 and 32, respectively, in constrictive sealing engagement, which prevents leakage of fluid from the axial bore 28 of the seat 21, but which permits the valve stem to be turned within the seat 21.

When the valve is assembled, the two union ends are disposed with the planar faces 17 of flanges 15 or 34 of the union ends abutting against the flat sides of the resilient seat 21 disposed therebetween. The union ends 11 are then engaged by the upper and lower body members 19 and 20, with the sloped bearing surfaces 24 of the body members in sliding contact with the correspondingly sloped bearing surfaces 18 or 38 of flanges 15 or 34, respectively. The upper and lower body members 19 and 20 are then drawn together by tightening the Allen screws 26 in the threaded bore holes 27. The drawing together of the body members in this way causes the sloped flanges 15, or the flanges 34 with filler members 36, to slide deeper into the body portions 19 and 20. Inasmuch as the bearing surfaces 24 of the body members are sloped inward, drawing of the body members together causes the union ends 11 to be drawn closer together in the axial direction, thus causing the planar faces 17 of the union ends to exert axial pressure on the opposite flat sides of the resilient seat 21. The drawing together of the body members also causes the central bearing surfaces 22 of the body members to exert pressure radially inward on the resilient seat 21. As the Allen screws 26 are tightened further, the central bearing surfaces 22 of the body members indent the periphery of the resilient seat 21, and the axial pressure of the flange faces 17 cause the edges of the resilient seat 21 to flow radially outward into the grooves 23 as seen in FIGS. 2, 4 and 5. The portions of the resilient seat 21 that are forced into the grooves 23 in this way are constricted between the outer edges of the central bearing surfaces 22, and the adjacent edges of the flanges 15, or flanges 34 and filler members 36 thus providing an effective seal.

It should be noted that increasing the constrictive force on the valve seat 21 also causes it to seal more tightly around the valve stems 31 and 32.

It should be noted that in the normal condition of assembly, the inner edges 25 of the body members 19 and 20 are not in contact with the body 12 of the union ends 11, as may be seen in FIGS. 2 and 4. This permits further tightening of the Allen screws 26 to draw the body members 19 and 20 closer together, thus forcing the flanges 15 further into the body members, and even into the grooves 23 in extreme cases, to exert greater constrictive pressure on the resilient seat 21, both axially and radially inward.

It will be seen, therefore, that the degree of constrictive force exerted on the resilient seat may be adjusted at will by merely tightening or loosening the Allen screws 26, or any other equivalent means employed for drawing the body members together. In this way the valve may be quickly and easily adjusted for use under widely varying conditions, from vacuum service up to pressures of 500 p.s.i.g. or more, if desired. In the event that the pressure in the conduit is increased for any reason, or wear of the seating member 21 causes leakage, all that is normally required to correct the situation and stop the leakage is merely to tighten the Allen screws 26. Inasmuch as tightening of the Allen screws causes radial constriction of the seating member 21 by reducing the effective diameter of the bearing circle formed by surfaces 22, the diameter of the axial bore hole 28 through the seat 21 will also be reduced. This causes the periphery of the bore 28 of the seat 21 to engage the periphery of the valve disc 29 more tightly, and thus increases the torque necessary to turn the valve stem 31 by means of the wheel 33. Therefore, the torque required to turn the wheel 33 is a direct indication of the degree of constriction being applied to the seat 21. Inasmuch as the valve disc 29 will abrade and wear the valve seat more rapidly as the degree of constriction of the seat 21 is increased, it is preferred to minimize the degree of constriction, and consequently the torque required to turn the wheel 33, consistent with maintaining the integrity of the valve against leakage under the operating conditions. On the other hand, if the fluid causes the valve seat 21 to swell, the Allen screws 26 may be loosened to compensate for the enlargement of the seat and consequent increase in constrictive force on the valve disc 29.

In its normal relaxed condition the bore 28 of the valve seat 21 is somewhat larger in diameter than the valve disc 29, thus facilitating assembly. The valve seat is made in the shape of a flat ring, i.e., it could be considered to be equivalent to a section of a thick walled, hollow right cylinder between two parallel planes normal to the axis of the cylinder. The seat 21 may be made of any suitable resilient material which is relatively inert under the conditions of use for which the valve is intended. A material suitable for many services, is "Hycar" rubber which may have a durometer hardness within the range of about 25 to 100, a durometer of about 50–55 being preferred for most purposes.

The slope of the bearing surfaces 24 on the body members 19 and 20, and the corresponding sclope of the bearing surfaces 18 on flanges 15, and bearing surfaces 38 on filler members 36, provides many of the advantages of the new valves. The angle of this slope may conveniently be measured with respect to the horizontal, the surface of body member 12 of the union ends being a convenient reference point. Suitable angles of slope are in the range of about 105° to 165°, angles of 110° to 135° being preferred, and an angle of about 120° being especially suitable for most purposes. Those skilled in the art will appreciate that the angle employed for any particular valve will be dictated by considerations of the service in which it is to be employed. The larger the angle, the greater the degree of radial compression, as opposed to axial compression, which will be exerted for a given degree of tightening of the Allen screws. Conversely, the smaller the angle, the greater the degree of axial compression which will be exerted, with respect to radial constriction, for a given degree of tightening of the Allen screws.

It should be noted that the valves of the present invention do not require any locking mechanism since they relay entirely upon jamming of the parts to preserve the integrity of the valve.

All parts of the valve can be manufactured to conventional tolerances and are fully interchangeable from one valve to another of the same size. This permits replacement of worn and damaged parts from a stock maintained for that purpose. This may be done, even in the field, in a matter of minutes, by unskilled workmen using commonly available tools.

In view of the above description, it will be apparent that the present invention, provides novel and improved butterfly type valves, which obviate the disadvantages of previously available valves of this type. More specifically, the new valves are fully adjustable while in use to prevent or stop leakage, whether caused by a change in the operating pressure or wear of the valve seat. The adjustability of the new valves also makes possible compensation for swelling of the valve seat and prolongation of the life of the valve seat by compensation for wear.

Although certain specific embodiments of the present invention have been shown in the accompanying drawings and described above, it is to be understood that modifications in the construction of the new valves may be made within the scope of the present invention as defined by the appended claims.

What is claimed is:

1. A disc type flow control valve comprising, an annular resilient valve seat member having an axial bore therethrough, a valve disc rotatably mounted within the bore of said seat member, means for rotating said valve disc between open and closed positions to control the flow of fluid through the bore of said seat member, a plurality of valve body members disposed around said seat member in sealed relationship therewith, a pair of union ends having flanges with sloped rearward bearing surfaces and forward bearing surfaces, the latter disposed in abutment with and on opposite sides of said seat member, said body members being adapted to slidably engage the sloped rearward bearing surfaces of the flanges of said union ends, and adjustable means to draw said valve body members together to cause the flanges of such union ends to exert axial forces on said seat, and to cause said valve body members to exert inward radial forces on said annular valve seat member, whereby the degree of constriction of said valve seat member by said axial and radial forces can be adjusted to prevent leakage under varying conditions of use.

2. A disc type flow control valve comprising, an annular resilient valve seat member having an axial bore therethrough, a valve disc rotatably mounted within the bore of said seat member, means for rotating said valve disc between open and closed positions to control the flow of fluid through the bore of said seat member, a pair of union ends, each having an axial bore therethrough and an upstanding annular flange at one end thereof having a sloped rearward bearing surface, said union ends being disposed in axial alignment with the bore of said seat member and with the flange of one of said union ends in abutment with each of the opposite sides of said valve seat member, a plurality of valve body members disposed around said seat member in sealed relationship therewith and in sliding contact with sloped rearward bearing surfaces of flanges of said union ends, means for adjustably drawing said valve body members together, to act against the flanges of said union ends to urge them together and exert axial pressure on said seat member, and to cause said valve body members to exert inward radial constrictive pressure on said seat member, whereby the degree of constriction of said valve seat member by said axial and radial forces can be adjusted to prevent leakage under varying conditions of use.

3. A disc type flow control valve comprising, an annular resilient valve seat member having an axial bore therethrough, a valve disc rotatably mounted within the bore of said seat member, means for rotating said valve disc between open and closed positions to control the flow of fluid through the bore of said seat member, a pair of union ends having a body portion provided with an axial bore therethrough and an upstanding annular flange having forward and rearward bearing surfaces, said rearward bearing surface forming an obtuse angle with the body portion of said union end, said union ends being disposed in axial alignment with the bore of said seat member and with the forward bearing surface of the flange of one of said union ends in abutment with each of the opposite sides of said seat member, a plurality of valve body members disposed around said seat member in sealed relationship therewith, said valve body members being provided with sloped bearing surfaces adapted to engage in sliding contact the sloped bearing surfaces of said flanges on said union ends, means for adjustably drawing said valve body members together to cause the sloped bearing surfaces of said body members to slide radially inward over the sloped bearing surfaces of said flanges thus causing said flanges to apply inward axial pressure on each side of said seat member, and causing said valve body members to apply inward radial pressure on said seat member, whereby adjustment of the means for drawing said valve body members together, the degree of constriction of said valve seat member by axial and radial forces can be adjusted to prevent leakage under varying conditions of use.

4. A disc type flow control valve according to claim 3 wherein said valve body members are provided with a central bearing surface in contact with the periphery of said annular resilient valve seat member.

5. A disc type valve according to claim 4 wherein said valve body members are provided with an annular groove on each side of said central bearing surface, whereby when said valve body members are drawn together, a portion of said resilient valve seat members is distorted and caused to flow and protrude into said grooves on each side of said central bearing surface to form a seal between the edges of said central bearing surface and the flanges of said union ends.

6. A disc type flow control valve comprising, an annular resilient valve seat member having an axial bore therethrough, a valve disc rotatably mounted within the bore of said seat member, means for rotating said valve disc between open and closed positions to control the flow of fluid through the bore of said seat member, a pair of union ends having a body portion provided with an axial bore therethrough and an upstanding annular flange having forward and rearward bearing surfaces normal to said body portion, a pair of filler members adapted to be placed around the body of each of said union ends, said filler members having a cross section such that when positioned adjacent the rearward surface of said flange, said filler members provide a bearing surface forming an obtuse angle with the body portion of said union end, said union ends being disposed in axial alignment with the bore of said seat member and with the forward bearing surface of the flange of one of said union ends in abutment with each of the opposite sides of said seat member, a plurality of valve body members disposed around said seat member in sealed relationship therewith, said valve body members being provided with sloped bearing surfaces adapted to engage in sliding contact the sloped bearing surfaces of said filler members on said union ends, means for adjustably drawing said valve body members together to cause the sloped bearing surfaces of said body members to slide radially inward over the sloped bearing surfaces of said filler members thus causing said filler members and flanges to apply inward axial pressure on each side of said seat member, and causing said valve body members to apply inward radial pressure on said seat member, whereby adjustment of the means for drawing said valve body members together, the degree of constriction of said valve seat member by said axial and radial forces can be adjusted to prevent leakage under varying conditions of use.

References Cited
UNITED STATES PATENTS

| | | | |
|---|---|---|---|
| 2,766,999 | 10/1956 | Watts et al. | 285—367 X |
| 3,043,557 | 7/1962 | Stillwagon | 251—306 |
| 3,129,920 | 4/1964 | Stillwagon | 251—306 X |
| 3,143,132 | 8/1964 | Pangburn | 251—306 X |
| 3,235,293 | 2/1966 | Condon | 285—367 X |

M. CARY NELSON, *Primary Examiner.*

R. C. MILLER, W. JOHNSON, *Assistant Examiners.*